United States Patent

Torre et al.

[11] Patent Number: 5,177,144
[45] Date of Patent: Jan. 5, 1993

[54] IMPACT-RESISTANT AND RIGID POLYAMIDE COMPOSITIONS

[75] Inventors: Hans D. Torre, Domat/Ems; Manfred Hoppe, Chur, both of Switzerland

[73] Assignee: Ems-Inventa AG, Switzerland

[21] Appl. No.: 622,337

[22] Filed: Nov. 27, 1990

Related U.S. Application Data

[63] Continuation of Ser. No. 463,779, Jan. 8, 1990, abandoned, which is a continuation of Ser. No. 219,996, Jul. 15, 1988, abandoned.

[30] Foreign Application Priority Data

Jul. 17, 1987 [CH] Switzerland ............ 02731/87

[51] Int. Cl.⁵ .................................. C08L 77/00
[52] U.S. Cl. ............................ 525/65; 525/66; 525/108; 525/179; 525/181; 525/182

[58] Field of Search .................... 525/66, 65

[56] References Cited

U.S. PATENT DOCUMENTS

| | | | |
|---|---|---|---|
| 4,086,295 | 4/1978 | Mori et al. | 260/857 |
| 4,567,235 | 1/1986 | Sasaki et al. | 525/113 |
| 4,602,058 | 7/1986 | Graham et al. | 525/183 |
| 4,942,200 | 7/1990 | Flexman et al. | 525/66 |

FOREIGN PATENT DOCUMENTS 0137958  7/1985  Japan ............................ 525/65

*Primary Examiner*—Ana L. Carrillo
*Attorney, Agent, or Firm*—Bierman and Muserlian

[57] ABSTRACT

A molding composition including a thermoplastic processable polyamide, an elastomer, and an epoxy having a plurality of epoxide groups.

8 Claims, No Drawings

IMPACT-RESISTANT AND RIGID POLYAMIDE COMPOSITIONS

This application is a continuation of application Ser. No. 07/463,779, filed Jan. 8, 1990, now abandoned, which is a continuation of application Ser. No. 219,996, filed Jul. 15, 1988, now abandoned.

The present invention is directed to impact-resistant and rigid polyamide compositions, more specifically such compositions which provide a high measure of rigidity and dimensional stability.

BACKGROUND OF THE INVENTION

Polyolefins have poor compatibility with a polyamide matrix. As a result, it is difficult to obtain blends which are both processable and practical and various expedients have been adopted in an attempt to solve this problem.

British Patent 998439 (German 1,241,606) teaches achieving high impact resistance by mixing two polyolefins into the rigid polyamides. In order to overcome the incompatibility problem, the olefins have unsaturated carboxylic acids grafted thereon.

Swiss Patent 649566 seeks to solve the same problem by introducing polyolefins based upon ethylene, propylene, and 1,4-hexadiene or 2,5-norbornadiene. These materials are activated by the introduction of $\alpha$, $\beta$ unsaturated dicarboxylic acids, anhydrides, or esters. Thus, the high bending E-modulus of the polyamide is modified by the unsaturated additives. Molded shapes prepared from such compositions have good impact and notched bar impact properties and high ductility. However, they are not sufficiently rigid, nor are they dimensionally stable. In other words, they have a great tendency to creep, which makes them unsuitable for many uses.

Another approach to the same problem is the introduction of core/shell polymers or grafted copolyolefins into rigid amorphous copolyamides. Such compositions are disclosed in U.S. Pat. Nos. 4,410,661 and 4,536,541. However, mixtures of the foregoing type exhibit substantial and undesirable shrinkage at elevated temperatures, even after only a short period of time. Therefore, shapes produced from such compositions are unsuitable for any use wherein exposure to elevated temperatures is involved.

A narrower improvement is shown in German 3,436,362, wherein rigid polyamides derived from terephthalic acid, isophthalic acid and alkanediamines form the basic material. To this is added copolymers of ethylene and/or acrylates to which carboxyl groups are grafted.

European Patent 27,198 teaches the addition of a core/shell polymer as a modifier of impact resistance. Acrylic acid derivatives are grafted onto a polybutadiene or butadiene/styrene core. This improves the impact resistance, but results in a substantial loss in stiffness. The patent teaches compensating for this loss by the addition of glass fibers.

U.S. Pat. No. 4,180,494 teaches the impact-resistance modifiers of the present invention, and German 3,339,000 teaches the use of similar core/shell polymers in conjunction with polyamides. However, molded shapes of this character are usually unsatisfactory, as they are not dimensionally stable. In particular, they tend to creep and to be highly susceptible to shrinkage under heat.

British Patent 1,069,176 seeks high thermal and dimensional stability for molded shapes by the addition of cross-linking diepoxides.

British 1,376,537 and German 2,144,687 introduce epoxide resins into plastomeric materials. These are substantially dimensionally stable and rigid; however, their impact-resistance is insufficient. Moreover, the presence of a high concentration of fillers and reinforcing agents produces a high density which, in many cases, is to be avoided.

Thus, there is a substantial need for polymeric materials which are impact-resistant, rigid, and dimensionally stable. In addition, such materials should be capable of simple injection molding. Such materials are used as casings and other protective parts in machines, vehicle bodies, etc.

BRIEF DESCRIPTION OF THE INVENTION

It is, therefore, desirable to provide molding compositions which are impact-resistant, rigid, dimensionally stable, without an excessive increase in density. Such products should have minimal creepage and shrinkage.

In accordance with the present invention, the foregoing requirements are met by the use of thermoplastic, processable polyamide compositions which contain an elastomer impact resistance modifier and an epoxide having more than one epoxide group.

In particular, it has been found that the combination of the epoxy compound and the impact resistance modifier in the polyamide produces a synergistic effect. The amount of modifier can be substantially reduced without impairing the desired impact properties. As a result, an improved relationship between resistance and rigidity can be obtained. Moreover, cost savings can also be realized. The shapes made from the foregoing materials are particularly stable and have minimal shrinkage when subjected to elevated temperatures.

DETAILED DESCRIPTION OF THE INVENTION

Polyamides which have been used as molding materials are generally useful in the present invention.

For example, specific mention is made of semicrystalline and amorphous copolyamides, e.g. those made from diamines and acidic monomers. Suitable diamines include hexamethylene diamine and its derivatives, mono and dicycloaliphatic diamines and derivatives thereof (especially of the alkylated bis(4-aminocyclohexyl)methane type) etc. The acids comprise isophthalic acid and terephthalic acid which may be substituted by other aromatic or aliphatic dicarboxylic acids.

Polyamide 6; polyamide 6,6; polyamide 6,10; polyamide 11; polyamide 12; and polyamide 6,12 have all been found to be suitable. Typical ether amides are reaction products of $H_2N-(R-O)_nR-NH_2$ with dicarboxylic acids. The ether ester amides have ester linkages in addition to the $-NH-CO-$ linkages. The foregoing materials are preferably used in amounts of at least 40% by weight of the total molding composition.

The molding compositions preferably contain at least 3% by weight of the impact resistance modifying material, based upon the total molding composition. More preferably, 5 to 30% by weight is used and 10 to 20% by weight is most desirable.

Such modifiers include copolymers of $\alpha$ olefins which are activated by subsequent grafting with an unsaturated copolyolefin, preferably an $\alpha$-unsaturated acid, and most preferably 1.0 mol % of an unsaturated dicarboxylic acid. This results in a maximum of 2.0 mol % carboxylic groups; ethylene is not more than 90 mol %, the rest preferably comprising propylene and/or 1-butene. Also, core/shell polymers are suitable. Preferably, these comprise a copolyolefin core which contains a butadiene or acrylate, and a shell of grafted vinyl compounds, e.g. acrylates. The metallic salts of the grafted copolymers (Ionomers) are not recommended because of the decrease in the number of adhesion sites.

Epoxy compounds suitable for use in the present invention are those which have at least two epoxy groups. Preferably, these are terminal, i.e. located at the ends of the molecule. Of special desirability are those epoxies having more than one glycidyl ether group in the molecule. They increase the molecular weight by linking the polyamide molecules. Very small amounts are sufficient; often an optimum can be found at less than 1% by weight, based on the total molding composition. It is preferred to use 0.05 to 5% and most preferred to use 0.1 to 1.0%, based on the molding composition. Polymeric epoxy compounds containing at least two epoxy groups or glycidyl groups in each molecule are also useful in the present invention.

Diglycidyl ethers having the formula Y—O—X—O—Y have been found especially advantageous. Y is an epoxide carrying radical and X is a divalent radical taken from the class consisting of alkyl having 2 to 10 carbons and aralkyl having 7 to 20 carbons. Those which are derivatives of neopentyl glycol and/or bisphenol A are deserving of particular mention.

Preparation of the compositions of the present invention is substantially conventional. The ingredients are premixed in the usual types of apparatus; such as, vibrating mixers, stirring mixers, mills, or phase mixers. Processing takes place in the melted form using screw machines such as extruders or plasticorders. These devices produce the compositions as granulates, strands, etc. which are then formed in injection molding machines or extruders in the usual manner.

Of course, normal additives, such as stabilizers, pigments, lubricants, emulsifiers, release agents, colorants, flame retardants, mineral or metallic fillers, reinforcing agents, etc. can all be included as needed.

EXAMPLES

The polyamide starting material was mixed sequentially with the impact resistance modifier and the epoxy compound. The combination was homogenized on a Werner Pfleiderer ZSK 30 two-phase extruder at 220° to 290° C. Thereupon, extrusion took place to yield a strand which was comminuted to form a uniform granulate. The granulate was dried under nitrogen at 80° to 90° C. and a vacuum of 30 to 50 mbar. Test bodies were then prepared using an Arburg extruder (type 320-210-250) and the various properties of the test bodies were measured.

The results are shown in Tables I to V herein. Some of the samples contain no epoxy and constitute comparisons with the prior art. The compositions set forth in Tables I to IV contain copolyolefin modifiers derived from ethylene, propylene, 1-butene modified with maleic acid anhydride. Table V displays the results of tests using the core/shell polymer. The melt viscosities are in Pas at 270° C. and 122.6N.

The impact and notch resistances were measured according to DIN 53453 dry at 23° C. No break is indicated by nb. The bending E modulus and the limit bending stress were determined in accordance with DIN Norm 53452 and the shrinkage values in the longitudinal direction are in accordance with DIN tension bars 53445/3. They were measured after storage for 24 hours in a circulating air oven at 100° C. and, in another test, for 1 hour at 140° C. The shrinkage values were determined for DIN tension bars 53445/3 after dry storage for 24 hours after injection molding. The values are given in percentages.

In Tables I, V and VI, polyamide 6 (melting point 221° C.) was used. In Table II, an amorphous polyamide which is the reaction product of hexamethylenediamine and isophthalic acid was the starting material. It had a glass transition temperature of 140° C.

Table III shows the results of the use of Grilamid TR 55 ($T_g$155° C.) which is also described in U.S. Pat. No. 4,356,300. Table IV describes the use of polyamide 12 having a melting point of 178° C. All the foregoing polyamides are commercial products of EMS-Chemie AG of Domat/Ems, Switzerland.

The preferred epoxy compound of Tables I to V is neopentyl diglycidyl ether, also known as 2,2'-(2,2-dimethyl-1,3-propanediyl)-bis(oxymethylene)bisoxirane. In Table II, test (1), 1,4-butanediglycidyl ether was used. Table VI shows the use of the diglycidyl ether derived from bisphenol A. G1302, a product of EMS-Chemie AG, has a molecular weight of 385.

TABLE I

| | | | | | 5 | 6 | 7 |
|---|---|---|---|---|---|---|---|
| | | 2 | 3 | 4 | Impact | Notch | Bending |
| | | Impact- | Digly- | Melt | Resis- | Impact | E Modu- |
| | 1 | Resis- | cidyl | Viscos- | tance | Resist | lus |
| 0 | Poly- | tance | ether | ity | 23° C./ | 23° C./ | 23° C./ |
| Test | amid- | modifier | wt. % | (270°/ | dry | dry | dry |
| No. | wt. % | wt. % | | 122.6N) | kJ/m2 | kJ/m2 | N/mm2 |
| (a) A28 pure | PA 6 100 | 0 | 0 | 350 | nb | 6.0 | 2000 |
| (b) E 5006 | PA 6 99.6 | 0 | 0.4 | '403 | nb | 4.1 | 2645 |
| (c) E 5179 | PA 6 85 | 15 | — | 578 | nb | 35.4 | 1203 |
| (d) E 5178 | PA 6 84.8 | 15 | 0.2 | 1363 | nb | 38.1 | 1950 |
| (e) E 5005 | PA 6 84.6 | 15 | 0.4 | 1342 | nb | 44.7 | 1940 |
| (f) E 5487 | PA 6 84.5 | 15 | 0.5 | 1032 | nb | 53.3 | 1870 |
| (g) | PA 6 | 12 | 0.5 | 1177 | nb | 32 | 2160 |

TABLE I-continued

Polyamide 6 - moulding materials with impact-resistance-modifier derived from dicarboxylic acids-grafted copolyolefines

| | | | | | | | | |
|---|---|---|---|---|---|---|---|---|
| E 5180 (h) | 87.5 PA 6 | 10 | 1.0 | 6071 | nb | 39 | | 1243 |
| E 4913 (i) | 89.0 PA 6 | 10 | 3.0 | >10000 | nb | 69.5 | | 2625 |
| E 4796 (k) | 87.0 PA 6 | 20 | 0.4 | 681 | nb | 14.3 (−40°) 50.4 | | 1667 |
| E 5007 (e) | 73.6 75 | 20 | 5.0 | >10000 | nb | nb | | 2045 |
| E 4575 (l) | 77.7 | 19.4 | 2.9 | 2065 | nb nb | 66.6 30.6 (−20°) | | 2039 |
| E 4574 (E 3752) (m) A 28NZ | 80 | 20 | — | 136 | nb | (−20°) 42 | | 1517 |

| 0 Test No. | 8 Limit Bending Stress N/mm2 | 9 Yield Stress 23°C./dry | 10 Elongation at Yield % | 11 Tensile Strength 23°C./dry N/mm2 | 12 Extension at Break % | 13 Shrinkage after 24 h/100°C. | 14 Shrinkage after 1 h/140°C. |
|---|---|---|---|---|---|---|---|
| (a) A28 pure | 100 | 85 | 10 | 55 | 10 | −0.36 | −0.75 |
| (b) E 5006 | 109 | — | — | — | — | −0.22 | −0.32 |
| (c) E 5179 | 84 | 57.3 | 7.0 | 42 | 17.2 | −0.38 | −0.47 |
| (d) E 5178 | 83 | 56.3 | 7.8 | 65.3 | 264 | −0.30 | −0.36 |
| (e) E 5005 | 79.6 | — | — | — | — | −0.28 | −0.35 |
| (f) E 5487 | 80 | — | — | — | — | — | — |
| (g) E 5180 | 90 | 42 | 7.3 | 53.3 | 144 | −0.16 | −0.33 |
| (h) E 4913 | 91.3 | — | — | — | — | — | — |
| (i) E 4796 | 104 | — | — | — | — | — | — |
| (k) E 5007 | 68.6 | | | | | −0.28 | −0.40 |
| (e) E 4575 | 77.7 | — | — | — | — | — | — |
| (l) E 4574 (E 3752) | 79.6 | — | — | — | — | — | — |
| (m) A 28NZ | 62 | 45 | 5 | 50 | 150 | −0.47 | −0.58 |

TABLE II

Amorphous copolyamide (type XE 3038) derived from hexamethylenediamine/isophthalic acid with impact-resistance-modifier (impact-resistance-modifier as in Table I)

| 0 Test No. | 1 Polyamid- wt. % | 2 Impact- Resis- tance modifier wt. % | 3 Digly- cidyl ether wt. % | 4 Melt Viscos- ity (270°/ 122.6N) | 5 Impact Resis- tance 23°C./ dry kJ/m2 | 6 Notch Impact Resist 23°C./ dry kJ/m2 | 7 Bending E Modu- lus 23°C./ dry N/mm2 | 8 Limit Bending Stress N/mm2 |
|---|---|---|---|---|---|---|---|---|
| (a) A2771 XE 3038 | 100 | 0 | 0 | 1755 | 40% nb 60% 60 | 1.5 | 2960 | 166 |
| (b) E 6248 | 99.7 | 0 | 0.3 | 2643 | 40% nb 60% 58 | 1.6 | 3120 | 125 |
| (c) E 6248 | 86.8 | 13 | 0.2 | 2643 | nb | 47.0 | 2350 | 114 |
| (d) E4471 E 6603 | 85 | 15 | — | — | nb | 38 | 1991 | 100.3 |
| (e) E 5864 | 84.8 | 15 | 0.2 | 2994 | nb | 51.3 | 2238 | 110 |
| (f) E 5864 | 84.7 | 15 | 0.3 | 3407 | nb | 49.2 | 2241 | 112 |
| (g) E 5866 | 84.6 | 15 | 0.4 | 4440 | nb | 49.9 | 2288 | 114 |
| (h) E 5275 | 80 | 20 | — | 4027 | nb | 42.2 | 1880 | 93 |

TABLE II-continued

Amorphous copolyamide (type XE 3038) derived from hexamethylenediamine/isophthalic acid with impact-resistance-modifier (impact-resistance-modifier as in Table I)

| | | | | | | | | |
|---|---|---|---|---|---|---|---|---|
| (i) E 6753 | 79.9 | 20 | 0.1 | 4801 | nb | 43.6 | 1920 | 92 |
| (k) E 6601 | 79.8 | 20 | 0.2 | — | nb | 45.6 | 2110 | 102 |
| (l) E 5867 | 84.7 | 15 | 0.3 | 4130 | nb | 47.1 | 2299 | 114 |

| 0 Test No. | 9 Yield Stress 23° C./dry | 10 Elongation at Yield % | 11 Tensile Strength 23° C./dry N/mm2 | 12 Extension at Break % | 13 Longitudinal Shrinkage after 24 h/100° C. | 14 Longitudinal Shrinkage after 1 h/140° C. | 15 % Injection Shrinkage after 24 h |
|---|---|---|---|---|---|---|---|
| (a) A2771 XE 3038 | 110 | 10.5 | 70 | 62 | 0.0132 | −0.332 | +0.218 |
| (b) E 6248 | — | — | — | — | −0.33 | −1.1 | |
| (c) E 6248 | 73 | 8 | 55 | 25 | −0.05 | −0.54 | |
| (d) E4471 E 6603 | — | — | — | — | +.17 | −2.0-4.0 | |
| (e) E 5864 | 68 | 9 | 55 | 46 | −0.092 | −3.8 | |
| (f) E 5864 | 70 | 7 | 57 | 61 | −0.07 | −3.1 | +0.315 |
| (g) E 5866 | 70 | 7 | 54 | 25 | −0.03 | −2.6 | |
| (h) E 5275 | 65 | 7 | 56 | 65 | +0.188 | −5.0-8.0 | −0.5-0. |
| (i) E 6753 | — | — | — | — | +0.02 | −3.9 | +0.374 |
| (k) E 6601 | 67 | 6.5 | 56 | 8 | −0.071 | −2.36 | |
| (l) E 5867 | 70 | 8.5 | 53 | 18 | −0.04 | −3.6 | |

TABLE III

Amorphous Copolyamide TR55 (impact-resistance-modifier as in Table I)

| 0 Test No. | 1 Polyamide wt. % | 2 Impact-Resistance modifier wt. % | 3 Diglycidyl ether wt. % | 4 Melt Viscosity (270°/122.6N) | 5 Impact Resistance 23° C./dry kJ/m2 | 6 Notch Impact Resist 23° C./dry kJ/m2 | 7 Bending E Modulus 23° C./dry N/mm2 | 8 Limit Bending Stress N/mm2 |
|---|---|---|---|---|---|---|---|---|
| (a) TR55 | 100 | 0 | 0 | 1200-1500 | nb | 5.0 | 2100 | 118 |
| (b) E5428 | 99.7 | 0 | 0.3 | 2189 | nb | 5.26 | 2160 | — |
| E5716 | 99.7 | 0 | 0.3 | 1241 | nb | 5.09 | 2080 | 119 |
| (c) E 5482 | 99.6 | 0 | 0.4 | 1446 | nb | 5.03 | 2190 | — |
| (d) F3-55 | 90 | 10 | — | 1516 | nb | 21.9 | 1730 | 101 |
| (e) E 6180 | 89.7 | 10 | 0.3 | 3511 | nb | 23.8 | 1860 | 98 |
| (f) F3-56 | 85 | 15 | — | 1454 | nb | 30.9 | 1737 | 89 |
| (g) E 5255 | 84.6 | 15 | 0.4 | 2601 | nb | 34.9 | 1780 | 88 |
| (h) F3-57 | 80 | 20 | — | 1755 | nb | 37.7 | 1504 | 77 |
| (i) E 7287 | 79.6 | 20 | 0.4 | 2815 | nb | 40.2 | 1800 | 95 |

| 0 Test No. | 9 Yield Stress 23° C./dry | 10 Elongation at Yield % | 11 Tensile Strength 23° C./dry N/mm2 | 12 Extension at Break % | 13 Longitudinal Shrinkage after 24 h/100° C. | 14 Longitudinal Shrinkage after 1 h/140° C. | 15 % Injection Shrinkage after 24 h |
|---|---|---|---|---|---|---|---|
| (a) TR55 | 75 | 8 | 60 | 30 | −0.07 | −0.09 | 0.8-1.0 |
| (b) E5428 | — | — | — | — | — | — | |
| E5716 | 80 | 11 | 55 | 24 | | | |
| (c) | — | — | — | — | −0.16 | 0.4 | |

TABLE III-continued

Amorphous Copolyamide TR55 (impact-resistance-modifier as in Table I)

| | | | | | | | |
|---|---|---|---|---|---|---|---|
| (d) E 5482 | 64 | 20 | 54 | 33 | −0.30 | −1.3 | −0.5 |
| (e) F3-55 | 64 | 10 | 50 | 50 | −0.08 | −0.36 | −0.36 |
| (f) E 6180 | 50.7 | 21 | 48 | 36 | −0.50 | −1.2 | −0.53 |
| (g) F3-56 | 60 | 10 | 52 | 82 | −0.23 | −0.98 | |
| (h) E 5255 | 21 | 22 | 44 | 36 | −0.58 | −2.6 | −0.69 |
| (i) F3-57 | 68 | 18 | 57 | 28 | −0.073 | −0.24 | −0.40 |
| E 7287 | | | | | | | |

TABLE IV

Polyamide 12 with impact-resistance-modifier (impact-resistance-modifier as in Table I)

| Test No. | 1 Polyamid- wt. % | 2 Impact- Resis- tance modifier wt. % | 3 Digly- cidyl ether wt. % | 4 Melt Viscos- ity (270°/ 122.6N) | 5 Impact Resis- tance 23° C./ dry kJ/m2 | 6 Notch Impact Resist 23° C./ dry kJ/m2 | 7 Bending E Modu- lus 23° C./ dry N/mm2 |
|---|---|---|---|---|---|---|---|
| (a) Grilamid L25 | 100 | — | — | | nb | 14.4 | 1256 |
| (b) E6413 | 99.75 | — | 0.25 | 1853 | nb | 15.6 | 1420 |
| (c) E5254 | 99.6 | — | 0.4 | — | nb | 23.2 | 1680 |
| (d) E6424 | 91.7 | 8 | 0.3 | 3698 | nb | 72.8 | 1350 |
| (e) E6423 | 89.7 | 10 | 0.3 | 3089 | nb | 65.3 | 1290 |
| (f) E3535 | 86.0 | 10 | 4.0 | >10000 | nb | nb | 2243 |
| (g) E3536 | 90 | 10 | — | 320 | nb | nb | 380 |

| Test No. | 8 Limit Bending Stress N/mm2 | 9 Yield Stress 23° C./ dry | 10 Elon- gation at Yield % | 11 Tensile Strength 23° C./dry N/mm2 | 12 Exten- sion at Break % | 13 Longi- tudinal Shrink- age after 24 h/100° C. | 14 Longi- tudinal Shrink- age after 1 h/140° C. |
|---|---|---|---|---|---|---|---|
| (a) Grilamid L25 | 64 | 44 | 9 | 47 | 178 | +0.25 | −0.9 |
| (b) E6413 | 65 | 45 | 7 | 44 | 126 | −0.20 | −0.82 |
| (c) E5254 | 72 | 50 | 7 | 60 | 153 | +0.13 | −0.5 |
| (d) E6424 | 60 | 40 | 8 | 44 | 120 | −0.14 | +0.8 |
| (e) E6423 | 57 | 38 | 10 | 46 | 140 | −0.24 | −0.6 |
| (f) E3535 | 122 | — | — | — | — | — | — |
| (g) E3536 | 58 | 38 | 23 | 42 | 280 | −0.36 | +1.15 |

TABLE V

Polyamide 6 with impact-resistance-modifier derived from core-sheath polymers

| Test No. | 1 Poly- amid- wt. % | 2 Impact- Resis- tance modifier wt. % | 3 Digly- cidyl ether wt. % | 4 Melt Viscos- ity (270°/ 122.6N) | 5 Impact Resis- tance 23° C./ dry kJ/m2 | 6 Notch Impact Resist 23° C./ dry kJ/m2 | 7 Bending E Modu- lus 23° C./ dry N/mm2 |
|---|---|---|---|---|---|---|---|
| (a) A28 pure | 100 | — | — | 350 | nb | 4.0 | 2000 |
| (b) E 5253 | 91.6 | 8 | 0.4 | 372 | nb | 7.3 | 2570 |

TABLE V-continued

Polyamide 6 with impact-resistance-modifier derived from core-sheath polymers

| | | | | | | | |
|---|---|---|---|---|---|---|---|
| (c) E 5004 | 89.6 | 10 | 0.4 | 454 | nb | 14.4 | 2360 |
| (d) E 5223 | 84.6 | 15 | 0.5 | — | nb | 18.5 | 2380 |
| (e) A28 NT | 75 | 25 | — | 434 | nb | 38 | 1572 |
| (f) E 5008 | 74.6 | 25 | 0.4 | 2394 | nb | 60% nb 40% 50 | 1698 |
| (h) E 4572 | 72 | 25 | 3.0 | 5369 | nb | 42.8 | 2005 |
| (i) E 5473 | 70 | 25 | 5.0 | — | nb | nb | 1974 |

| 0 Test No. | 8 Limit Bending Stress N/mm2 | 9 Yield Stress 23° C./dry | 10 Elongation at Yield % | 11 Tensile Strength 23° C./dry N/mm2 | 12 Extension at Break % | 13 Longitudinal Shrinkage after 24 h/100° C. | 14 Longitudinal Shrinkage after 1 h/140° C. |
|---|---|---|---|---|---|---|---|
| (a) A28 pure | 100 | 83 | 10 | 55 | 30 | −0.36 | −0.75 |
| (b) E 5253 | 106 | 73 | 7 | 54 | 10 | −0.28 | −0.48 |
| (c) E 5004 | 97 | — | — | — | — | −0.40 | −0.50 |
| (d) E 5223 | 91 | 63 | 7 | 51 | 123 | −0.42 | −0.34 |
| (e) A28 NT | 66.2 | 45 | 5 | 40 | 110 | −0.65 | −0.57 |
| (f) E 5008 | 69.6 | — | — | — | — | −0.48 | −0.39 |
| (h) E 4572 | 78.5 | — | — | — | — | — | — |
| (i) E 5473 | 76.8 | — | — | — | — | — | — |

TABLE VI

Polyamide 6 with impact-resistance-modifier (C elastomeric copolyolefine type) and diglycidyl ether

| 0 Test No. | 1 Polyamid- wt. % | 2 Impact-Resistance modifier wt. % | 3 Diglycidyl ether wt. % | 4 Melt Viscosity (270°/ 122.6N) kJ/m2 | 5 Impact Resistance 23° C./ dry kJ/m2 | 6 Notch Impact Resist 23° C./ dry N/mm2 | 7 Bending E Modulus 23° C./ dry N/mm2 | 8 Limit Bending Stress N/mm2 | 9 Yield Stress 23° C./ dry N/mm2 | 10 Elongation at Yield % | 11 Tensile Strength 23° C./dry N/mm2 | 12 Extension at Break % |
|---|---|---|---|---|---|---|---|---|---|---|---|---|
| A28NZ | 80% | 20 | — | 136 | nb | 42 | 1517 | 62 | 45 | 5 | 50 | 150 |
| E7716 | 84.2% | 15 | 0.8% G1302 | 814 | nb | 44.4 | 1951 | 78 | 56 | 6 | 62 | 150 |
| E7718 | 79.2% | 20 | 0.8% G1302 | 2808 | nb | 53.8 | 1760 | 69 | 48 | 7 | 51 | 135 |

What we claim is:

1. A rigid molding composition consisting essentially of a thermoplastic processible polyamide, an elastomer, and an epoxy having a plurality of epoxide groups, said epoxy has the formula $$Y-O-X-O-Y$$

wherein Y is an epoxide carrying radical and X is a divalent radical taken from the class consisting of alkyl of two to ten carbon atoms and aralkyl of seven to twenty carbon atoms, wherein said elastomer is at least one copolymer of an α-olefin grafted with an unsaturated dicarboxylic acid, said elastomer comprising 3 to 20 percent by weight of said composition.

2. The composition of claim 1 wherein said polyamide comprises at least 40% by weight of said composition.

3. The composition of claim 1 wherein said amount is 10 to 20%.

4. The composition of claim 1 wherein said epoxy is neopentyl diglycidyl ether, bisphenol A derived diglycidyl ether, or a mixture thereof.

5. The composition of claim 1 wherein said epoxy comprises 0.01 to 15% by weight of said composition.

6. The composition of claim 5 wherein said epoxy comprises 0.05 to 5.0% by weight of said composition.

7. The composition of claim 1 wherein said copolyolefin comprises a maximum of 90 mol % ethylene and is grafted with a maximum of 1 mol % of unsaturated dicarboxylic acid thereby providing a maximum of 2 mol % active carboxylic groups.

8. The composition of claim 6 wherein said epoxy comprises 0.1 to 1.0% by weight of said composition.

* * * * *